(12) United States Patent
Aoyama

(10) Patent No.: US 6,654,559 B2
(45) Date of Patent: Nov. 25, 2003

(54) CAMERA

(75) Inventor: Keisuke Aoyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/147,163

(22) Filed: May 16, 2002

(65) Prior Publication Data

US 2002/0172516 A1 Nov. 21, 2002

(30) Foreign Application Priority Data

May 21, 2001 (JP) .......................................... 2001-150913
May 10, 2002 (JP) .......................................... 2002-136136

(51) Int. Cl.$^7$ ........................... G03B 17/18; G03B 17/38
(52) U.S. Cl. ........................ 396/266; 396/374; 396/287; 396/429; 348/207.2; 348/333.02
(58) Field of Search ................................ 396/287, 374, 396/281, 429, 296, 266, 503; 348/333.015, 333.02, 333.04, 207.2

(56) References Cited

U.S. PATENT DOCUMENTS 6,441,854 B2 * 8/2002 Fellegara et al. ...... 348/333.01
6,504,575 B1 * 1/2003 Ramirez et al. ........ 348/333.02

* cited by examiner

Primary Examiner—W. B. Perkey
(74) Attorney, Agent, or Firm—Robin, Blecker & Daley

(57) ABSTRACT

A camera is disclosed that includes: a plurality of operating members which is operated to set states of the camera and operating conditions, or to cause the camera to perform operations; a display unit which displays guidance information on the set state of the camera, the set operating condition, and the operating members; and a control circuit which allows setting the state of the camera and the operating condition in accordance with operation of the operating member and prohibiting any image-taking operation, with the guidance information displayed on the display unit. According to the camera of this invention, a photographer can operate various operating members while seeing the guidance information without waste of image-taking operation. The photographer can also perform various settings while seeing the guidance information since setting the state (mode or the like) of the camera or the operating condition is allowed even when the guidance information is displayed.

17 Claims, 12 Drawing Sheets

CAMERA

BACKGROUND OF THE INVENTION

1. Field of the Invention

The present invention relates to a camera having a function of displaying guidance information such as information on a state of the camera, a set operating condition, and operating members.

2. Description of the Related Art

Most multifunctional single-lens reflex cameras display on their operating panels a shutter speed, an aperture, an exposure meter, and a set mode such as an AF mode or an AE mode. Photographers have had to read an instruction manual if they want to know detailed information of a mode to be used (such as a photographing procedure or a photography effect) when photographing (that is, image-taking) with an arbitrary photography mode.

Most cameras have operating buttons, on which or around which symbols, text, or drawings are indicated that represent functions of the operating buttons in a simple manner. However, it is difficult to understand use of the functions or photography effects only from such simplified symbols or the like.

Japanese Patent Laid-Open No. 5-216106 proposes a camera including a display panel on an outer surface thereof, the display panel displaying operational guidance information to describe operating members or operating methods. This eliminates a photographer having to always carry an instruction manual, and allows him to easily know detailed use of various functions or photography effects obtained by the functions.

Japanese Patent Laid-Open No. 2000-250119 proposes a camera in which guidance information on a plurality of photography modes set in photography or functions of a main dial can be checked on a finder such that a photographer can learn operating methods in the same manner as in actual photography while viewing through the finder.

However, the camera proposed in Japanese Patent Laid-Open No. 5-216106 cannot be operated in a mode of displaying the guidance information. Thus, it is impossible to actually make the camera operate, or set various modes or operating conditions while seeing the displayed guidance information.

The camera proposed in Japanese Patent Laid-Open No. 2000-250119 allows a photographer to see guidance information while viewing through a finder. However, a mode of displaying the guidance information in the finder and a mode of actually performing operations of the camera are different, thus it is impossible to actually make the camera operate, or set various modes or operating conditions while seeing the guidance information.

On the other hand, enabling the camera to be operated with the guidance information displayed makes it impossible to operate the operating members just for seeing the guidance information, and display of the guidance information on the operated operating member and operation of the camera corresponding to the operated operating member are both performed.

For example, even if guidance information is displayed when a midroll rewind button is operated, there is no use displaying the guidance information since the rewinding simultaneously starts.

SUMMARY OF THE INVENTION

The present invention has an object to provide a camera having a function of displaying guidance information, the camera allowing setting a state of the camera or an operating condition while seeing the guidance information, and preventing actual operation of the camera by an operating error.

In order to attain the above described object, a camera according to the invention includes:

a plurality of operating members which are operated to set states of the camera and operating conditions, or to cause the camera to perform operations;

a display unit which displays guidance information on the set state of the camera, the set operating condition, and the operating members; and a control circuit which allows setting the state of the camera and the operating condition in accordance with operation of the operating member and prohibiting any image-taking operation, when the guidance information is displayed on the display unit.

In the above described invention, image-taking disabling operation in accordance with operation of the operating member may be prohibited, with the guidance information displayed on the display unit.

The "image-taking disabling operation" refers to film rewinding or ejecting a film cartridge for a film camera, and refers to ejecting a removable memory for a digital camera. Powering off of the camera may be included.

In order to attain the above object, a camera according to the invention includes:

a plurality of operating members which are operated to set states of the camera and operating conditions, or to cause the camera to perform operations;

a display unit which displays guidance information on the set state of the camera, the set operating condition, and the operating members; and a control circuit which allows setting the state of the camera and the operating condition in accordance with operation of the operating member and prohibiting any output operation of taken image information (for example, output of image information to a printer for printing images), when the guidance information is displayed on the display unit.

In each aspect of the invention, the camera has a guidance display switch which is operated to switch display/non-display of the guidance information on the display unit, and when an operating member which causes the camera to perform the image-taking operation, the image-taking disabling operation, or the output operation of taken image information together with the guidance display switch is operated, the image-taking operation, the image-taking disabling operation, or the output operation of the taken image information may be allowed, when the guidance information is displayed on the display unit.

Further, in order to attain the above object, a camera according to the invention includes:

a plurality of operating members which are operated to cause the camera to perform predetermined operations, the operating members including an printing operating member which causes a printer to perform printing operation; and a control circuit which makes the camera perform operations in accordance with operations of predetermined operating members except at least the printing operation in accordance with an operation of the printing operating member, when guidance information is displayed on the operating members.

A detailed configuration of the CAMERA of the invention, the above and other objects and features of the invention will be apparent from the embodiments, described below.

DETAILED DESCRIPTION OF THE PREFERRED EMBODIMENTS

Hereinafter, preferred embodiments of the invention will be described in detail with reference to the drawings.

Figure 1:
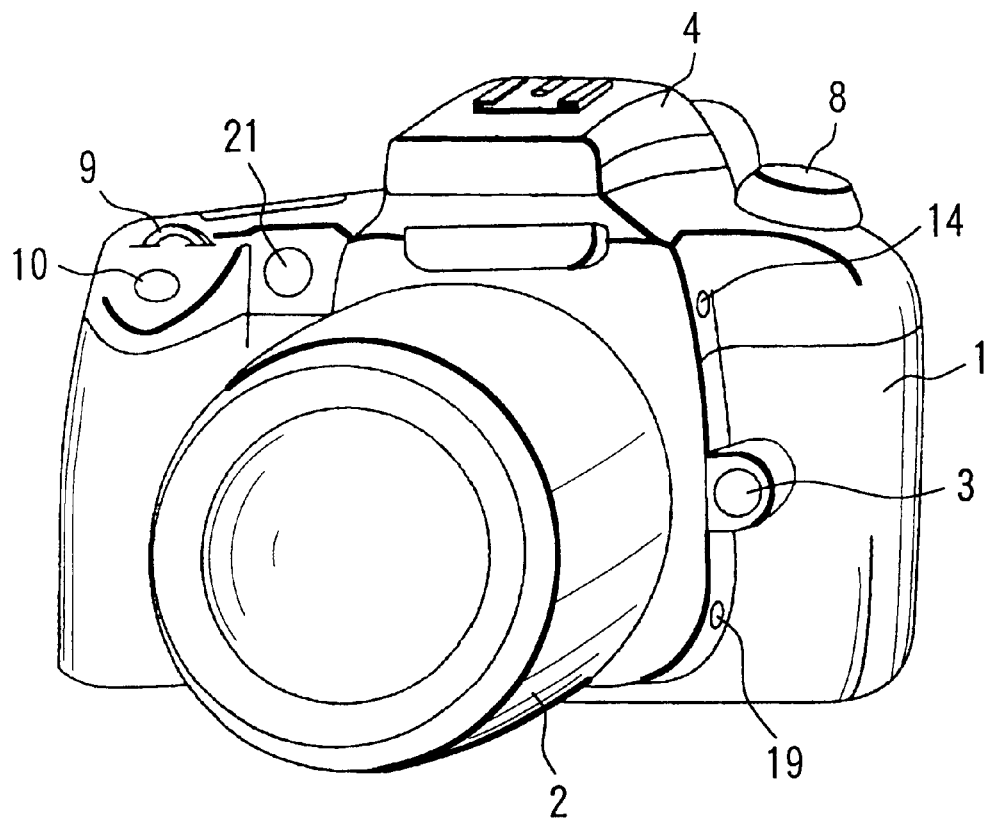
FIG. 1 is a front perspective view of a camera according to an embodiment of the invention.
Figure 3:
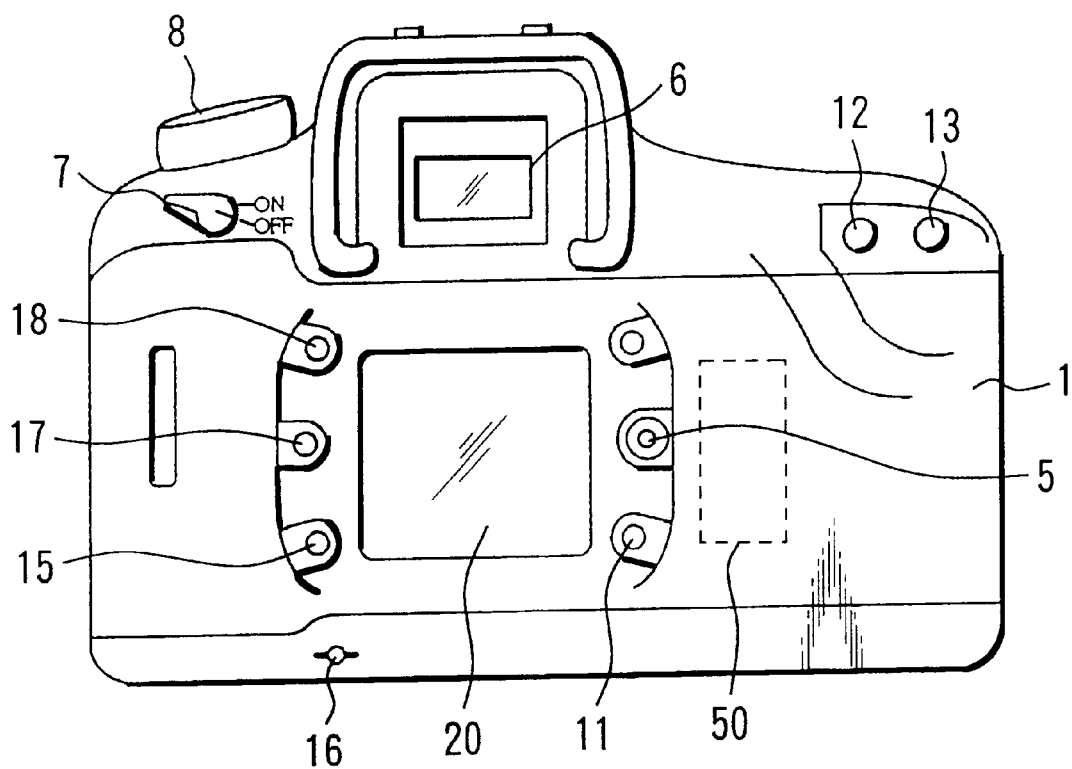
FIG. 3 is a rear elevational view of the camera.

FIGS. 1 and 3 are front and rear views, respectively, of a camera according to an embodiment of the invention. The camera of this embodiment is a film camera of a type exposing (taking) a subject image onto a film drawn from a loaded film cartridge to record.

Reference numeral 1 denotes a camera body; 2, an interchangeable lens attached to and removable from the camera body 1; and 3, a lens removing button for removing the interchangeable lens 2 from the camera body 1.

Reference numeral 4 denotes a built-in flash held in the camera body 1; and 6, a finder for observing a subject.

Reference numeral 5 denotes a guidance button (hereinafter referred to as a G button), and pressing the G button 5 and then turning a main dial described below allows switching a guidance display on/off. If other operating members are operated while pressing the G button when the guidance display is on (hereinafter referred to as a guidance mode), operations of the camera prohibited in the guidance mode can be performed.

The operations of the camera prohibited in the guidance mode refer to photography (release) or film rewinding, as will be described below. Powering off of the camera may be included.

Reference numeral 7 denotes a main switch for power on/off of the camera; 8, a mode dial for switching photography modes of the camera (states of the camera); and 9, a main dial for inputting photography conditions such as a shutter speed or an aperture of the camera.

Reference numeral 10 denotes a release button in the form of a two stage switch for starting photometry and ranging and for release (photography, that is, image-taking). By lightly pressing the release button 10 to a first stage the button is in a "half press" state, and the photometry and ranging are performed in this state. By pressing the button 10 from the half press to a second stage the button is in a "full press" state, and the full press causes a shutter to operate to expose a film, and the film automatically advances a single frame after the exposure.

Reference numeral 11 denotes a light button for turning on a back light of an external liquid crystal display panel described below; 12, an AE (Auto Exposure) lock button for AE lock photography; and 13, an exposure compensation button for compensating the exposure in combination with the main dial 9. In a manual photography mode, an aperture can be manually set by the exposure compensation button 13.

Reference numeral 14 denotes a built-in flash button for enabling use of the built-in flash 4; 15, a self-timer button for use of a self-timer function of the camera; and 16, a midroll rewind button for rewinding the loaded film into the cartridge.

Reference numeral 17 denotes an AF (Auto Focus) frame switching button, and pressing the button and then turning the main dial 9 allows switching focusing ranges in a photography image area, that is, AF frames.

Reference numeral 18 denotes a function button (hereinafter referred to as a FUNC button), and each press of this button causes a setting mode such as of film sensitivity, red-eye reduction function on/off, beep on/off, multiple exposure, or AEB. A state of pressing the FUNC button 18 for these settings is referred to as a FUNC mode, and pressing the FUNC button 18 from a normal photography state causes a setting mode that was last set.

Reference numeral 19 denotes a depth-of-field preview button for stopping down a lens to an aperture set at that time. This allows a photographer to check depth of field.

Reference numeral 20 denotes an external liquid crystal display panel for displaying setting states of the camera, the number of photographs, or use/disuse of the built-in flash; 21, a red-eye reduction lamp that fires for reducing "red eyes" in flash photography.

The camera of this embodiment thus has the switch, the buttons, and the dials 7 to 19 that are a plurality of operating members operated for setting the modes (states) of the camera or the operating conditions, or for causing the camera to perform operations. The camera of this embodiment also has the G button 5 for switching display/non-display of guidance information on the external liquid crystal display panel 20, the guidance information referring to information for guidance on the set mode of the camera or the set operating condition, and further on the switch, the buttons, and the dials 7 to 19.

Figure 2:
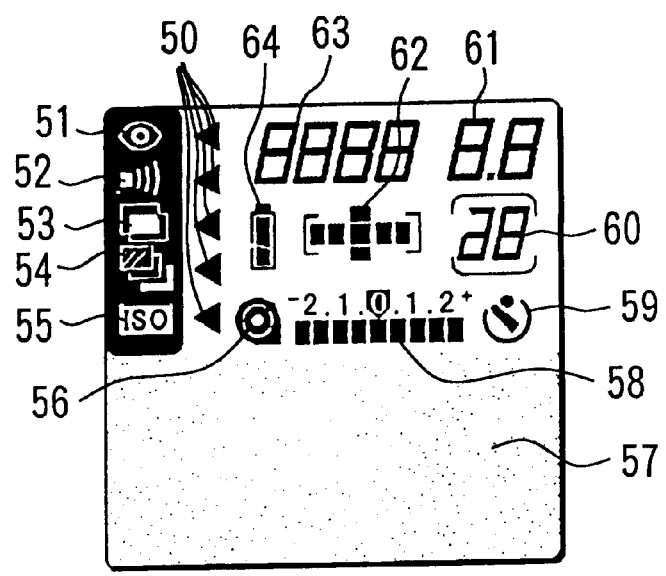
FIG. 2 shows display contents of an external liquid crystal panel.

FIG. 2 shows display contents of the external liquid crystal display panel 20. In this drawing, reference numeral 40 denotes function setting indicators for indicating which function is set among functions of the camera corresponding to marks 51 to 55. During detailed setting of a function, a function setting indicator 40 lights up only at a position next to a mark corresponding to the function.

The marks indicating the functions include a red-eye reduction mark 51, a beep mark 52, a multiple exposure mark 53, an AEB mark 54, and an ISO mark 55. When manually setting the red-eye reduction function on/off, the beep on/off, the number of multiple exposures, an amount of exposure shift of the AEB, or the film sensitivity, a function setting indicator 40 corresponding to each mark lights up.

For example, during setting the red-eye reduction function on/off, a function setting indicator only on the right of the red-eye reduction mark 51 lights up. In the photography mode, one or more function setting indicators on the right of one or more set functions light up. When the red-eye reduction function and the beep are set, the uppermost function setting indicator and the next function setting indicator light up.

Reference numeral 56 denotes a cartridge mark, which is indicated when the film (cartridge) is loaded in the camera.

Reference numeral 57 denotes a guidance display section, and when any of the plurality of operating members (7 to 19) is operated, it displays guidance information on the operating member.

Reference numeral 58 denotes an exposure compensation indicator for indicating a difference (the number of stages) from the reference value 0 in exposure compensation or an exposure level in manual photography.

Reference numeral 59 denotes a self-timer indicator, which is indicated when the self-timer is on.

Reference numeral 60 denotes a film counter for indicating a position of a film frame for next photography.

Reference numeral 61 denotes an aperture indicator for indicating a set aperture.

Reference numeral 62 denotes an AF frame indicator for indicating a current position of a selected AF frame or a position of an AF frame selected automatically by the camera.

Reference numeral 63 denotes a shutter speed indicator for indicating a shutter speed manually set by the photographer or automatically set by the camera.

Reference numeral 64 denotes a battery indicator for indicating remaining capacity of a battery loaded in the camera.

Next, a function of the mode dial 8 will be described with reference to FIG. 4.

In the drawing, reference numeral 70 denotes a creative zone, which includes a mode mark "P" indicating a program AE photography mode, a mode mark "Tv" indicating a shutter speed-priority AE photography mode, a mode mark "Av" indicating an aperture priority AE photography mode, a mode mark "M" indicating a manual exposure photography mode, and a mode mark "A-DEP" indicating an auto depth photography mode.

Turning the mode dial 8 to match any of the mode marks in the creative zone 70 to a mark not shown or the like on the camera body 1 causes a photography mode corresponding to the mode mark (creative mode).

In the photography mode indicated in the creative zone 70, the operating conditions in photography such as an AF frame to be used, use/disuse of the flash, an amount of exposure shift of the AEB, or the number of multiple exposures can be set to meet the photographer's needs.

Now, each of the photography modes will be described.

P: Intelligent Program AE Photography Mode

When the release button 10 is half pressed, the camera automatically determines a shutter speed and an aperture. The photographer can operate the main dial 9 for a program shift.

Tv: Shutter Speed-Priority AE Photography Mode

When the photographer sets a shutter speed with the main dial 9, the camera automatically sets an aperture in accordance with brightness of the subject.

Av: Aperture Priority AE Photography Mode

When the photographer sets an aperture with the main dial 9, the camera automatically sets a shutter speed in accordance with brightness of the subject.

M: Manual Exposure Photography Mode

The photographer can determine a shutter speed or an aperture to photograph. The shutter speed is set directly with the main dial 9, and the aperture is set by turning the main dial 9 while pressing the exposure compensation button 13.

A-DEP: Auto Depth Photography Mode

An aperture and a focus position are determined such that a plurality of subjects overlapping the AF frame are within the depth of field.

Figure 4:
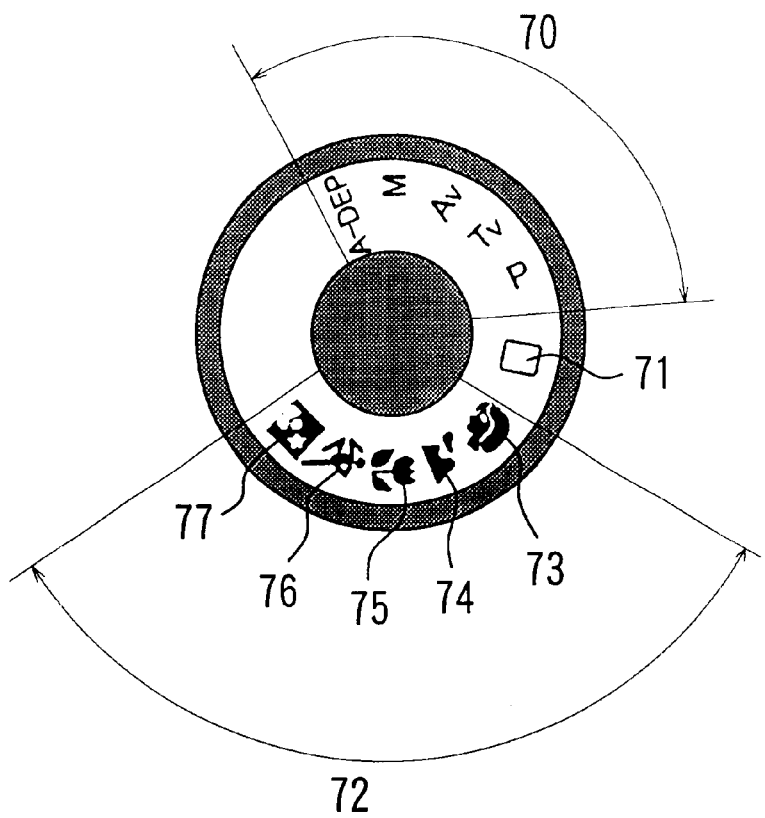
FIG. 4 illustrates a mode dial of the camera.

In FIG. 4, reference numeral 71 denotes a fully automatic photography mode zone, and turning the mode dial 8 to match the mode marks in the zone 71 to a mark not shown or the like on the camera body 1 causes a photography mode corresponding to the mode mark (fully automatic mode). In this fully automatic mode, the camera automatically sets an optimal AF frame, shutter speed, or aperture. Thus, the photographer can photograph well simply by pressing the release button 10.

Reference numeral 72 denotes an image zone, which includes a mode mark 73 indicating a portrait mode, a mode mark 74 indicating a landscape mode, a mode mark 75 indicating a close-up mode, a mode mark 76 indicating a sports mode, and a mode mark 77 indicating a night scene mode. Turning the mode dial 8 to match any of the mode marks in the image zone 72 to a mark not shown or the like on the camera body causes a photography mode corresponding to the mode mark (image mode).

In the fully automatic mode, the portrait mode, the close-up mode, and the landscape mode, the flash automatically fires as required when photographing in low light or against the light in daylight.

For film advance, continuous advance is set in the portrait mode and the sports mode, and single frame advance is set in the fully automatic mode, the landscape mode, the close-up mode, and the night scene mode.

Next, the guidance information displayed on the external liquid crystal display panel 20 will be described. Turning the main dial 9 while pressing the G button 5 causes the guidance mode. In the guidance mode, the following guidance information is displayed when the operating members (7 to 19) are operated. The guidance information described herein is illustrative, and other contents may be displayed.

FUNC Mode

The photography mode or the operating condition set at that time is displayed on the external crystal panel 20 to allow setting the photography mode or the operating condition. A mode that was last set in a FUNC mode is displayed.

Beep Setting Mode

Pressing the FUNC button 18 from a normal photography state causes a beep setting mode. Displayed guidance information is as follows:

"Beep Setting Mode. OFF: Beep off. Sets the function ON/OFF with the main dial. Other functions can be set by further press of the FUNC button." (see FIG. 5(A)).

Figure 5:
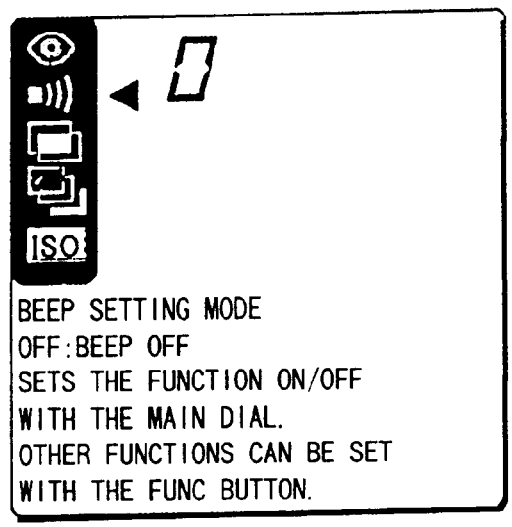
FIG. 5(A) shows an example of guidance information.
FIG. 5(B) shows an example of guidance information.
Figure 5:
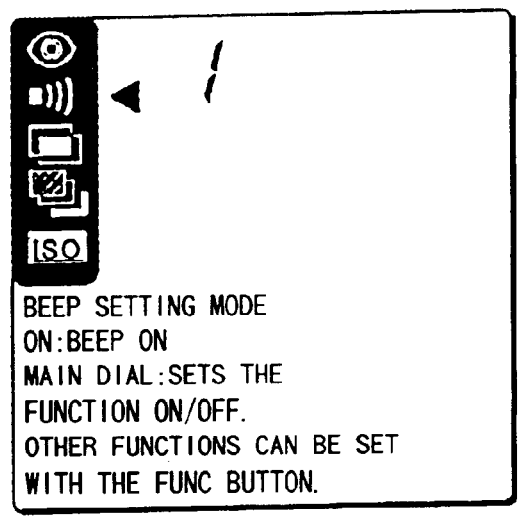

Turning the main dial one click in this state causes the beep on, and displayed information is as follows:

"Beep Setting Mode. ON: Beep on." as shown in FIG. 5(B).

Operating the main dial 9 causes display as follows:

"Main dial: Sets the function ON/OFF."

In the FUNC mode, each displayed description includes, at the bottom thereof, information "Other function can be set by further press of the FUNC button".

The guidance information on each mode or each operating condition is as follows. Also in the guidance mode, operating the described operating member allows setting the photography mode and the operating condition.

Red-Eye Reduction Setting Mode

"Red-eye reduction setting mode. ON: Red-eye reduction lamp lights up (OFF: Red-eye reducing function is not used). Sets the function ON/OFF with the main dial. Other functions can be set by further press of the FUNC button."

Film Sensitivity Manual Setting Mode

"Film sensitivity setting mode. Sets the film sensitivity with the main dial. Other functions can be set by further press of the FUNC button.

Multiple Exposure Setting Mode

"Multiple exposure setting mode. The number of multiple exposures: NN. (NN refers to the number of multiple exposures) Sets the number of multiple exposures with the main dial. Other functions can be set by further press of the FUNC button."

AEB Setting Mode

"AEB setting mode. Sets an amount of exposure compensation with the main dial. The amount of exposure compensation is MM. (MM refers to the amount of exposure compensation) Other functions can be set by further press of the FUNC button."

Main Switch 7

(From OFF to ON) "Main switch. Camera ON. Working."

(From ON to OFF) "Main switch. Camera OFF. Not working."

When the camera is switched off, this display disappears after about 6 seconds. Other operating members do not work during this display.

Mode Dial 8

Operating the mode dial 8 causes display of the guidance information of the photography mode matched to the mark on the camera body 1. Operating the mode dial 8, and with the guidance information thereof displayed, operating other operating member causes display of guidance information on the newly operated operating member in part or the whole of the display. The guidance information when the mode dial 8 is operated is as follows:

Night Scene Mode

"Night scene mode. You can photograph night scenes as viewed.

Sports Mode

"Sports mode. A mode of combination of a moving body prediction AI servo and high speed program AE."

Close-Up Mode

"Close-up mode. You can easily photograph close-up small subjects."

Landscape Mode

"Landscape mode. You can clearly photograph both close views and distant views."

Portrait Mode

"Portrait mode. You can photograph people contrasted with background by distracting the background."

Fully Automatic Mode

"Fully automatic mode. You can easily photograph well simply by pressing the shutter button."

When with each photography mode in the image zone 72 that can be set by the mode dial 8 being set, an operating member having no relation to the mode is operated, information on a name of the operating member and on the operation being ineffective is displayed.

Guidance information on the creative mode is as follows:

Shutter Speed-Priority AE Mode

"(Tv) Shutter speed-priority AE mode. Sets the shutter speed with the main dial to photograph."

Figure 7:
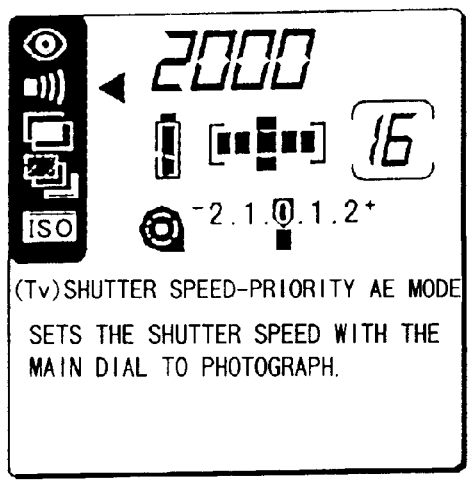
FIG. 7(A) shows another example of guidance information.
FIG. 7(B) shows another example of guidance information.
Figure 7:
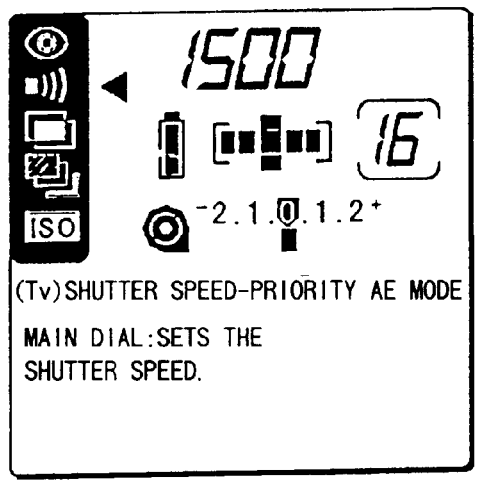

Turning the main dial 9 from a state shown in FIG. 7(A) to change the shutter speed causes change in the guidance information such that a description "Sets the shutter speed with the main dial to photograph" is replaced by the guidance information when the main dial 9 is operated in the shutter speed-priority AE mode "Main dial: Sets the shutter speed". This applies to other photography modes.

Intelligent Program AE Mode

"(P) Intelligent program AE mode. You can turn the main dial for the program shift.

"(Av) Aperture priority AE mode. Set the aperture with the main dial to photograph."

Manual Exposure Mode

"(M) Manual exposure mode. Both the shutter speed and the aperture are determined to suit pictures to be photographed."

Auto Depth Mode

"Auto depth (A-DEP) mode. The camera sets apertures and focus positions to focus on each of subjects captured at a plurality of AF frames."

Operating the buttons (11 to 17) for setting the operating conditions causes display of the following guidance information, or causes the following operation to be performed.

Light Button 11

Information "Display panel light button. Lights on the display panel." is displayed to simultaneously light the display panel.

AE Lock Button 12

"AE lock button. Button for AE lock photography. An asterisk is shown in the finder to lock exposure values (AE lock)."

Exposure Compensation Button 13

(When the photography mode is A-DEP, Av, Tv, or P) "Button for exposure compensation. Turn the electric dial while pressing the button to set a desired amount of compensation."

(When the photography mode is M) "Manual aperture setting button. Turn the electric dial while pressing the button to set a desired Av value."

(In the image mode) "Exposure compensation/manual aperture setting button. It cannot be set in this photography mode."

Built-in Flash Button 14

(In the Creative Mode)

"Built-in flash button. Fires in photography. Press down the flash when not used."

(In the Image Mode)

"Built-in flash button. Automatically fires when photographing subjects in low light or against the light in this photography mode."

Self-Timer Button 15

"Self-timer photography button. Photographed about 10 seconds after pressing the shutter button."

AF Frame Switching Button 17

"AF frame switching button 17. You can press the button and then select the Af frame with the main dial.

Depth-of-Field Preview Button 19

"Button for checking depth of field. You can stop down to a set aperture and check a focused range through the finder."

Main Dial 9

When the main dial 9 is operated, what is set by operating the main dial 9 in the mode set at that time is displayed as the guidance information.

Specifically, "Main dial: Sets the shutter speed" (see FIG. 7(B))."

"Main dial: Sets the aperture."

"Main dial: Sets the function ON/OFF."

"Main dial: Sets the film sensitivity."

"Main dial: Sets the AF frame."

Midroll Rewind Button 16

Figure 6:
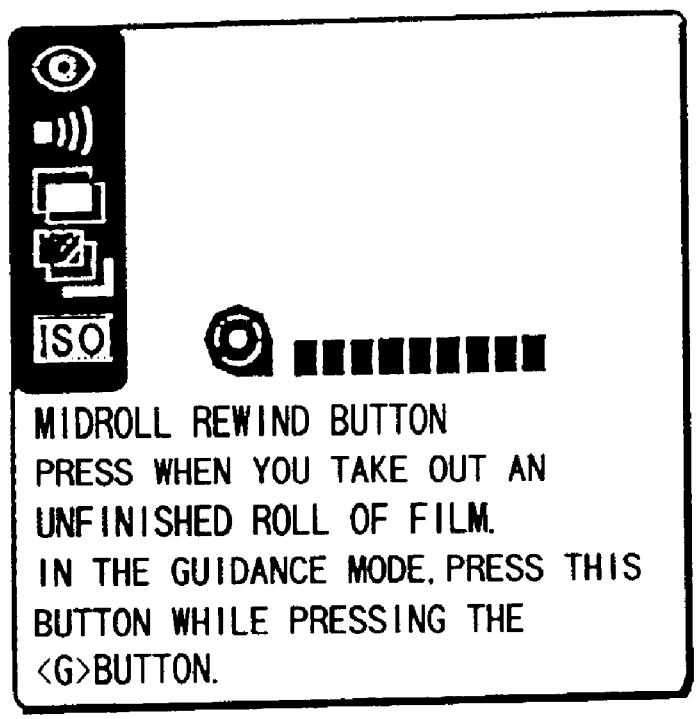
FIG. 6 shows another example of guidance display.

"Midroll rewind button. Press when you take out an unfinished roll of film. In the guidance mode, press this button while pressing the <G> button." (see FIG. 6)

In the guidance mode, if film rewinding is unnecessarily performed by operating the midroll rewind button 16 while the photographer just checks a function or the like of each operating member in the guidance information, photography thereafter becomes impossible to cause unavailability.

In this embodiment, to overcome such inconvenience, with the guidance information displayed (in a guidance mode), film rewinding is not performed unless the midroll rewind button 16 is operated while pressing the G button 5.

Specifically, unless the midroll rewind button 16 is operated while pressing the G button 5, the film rewinding in accordance with the operation of the midroll rewind button 16 is prohibited. In other words, the operation of the midroll rewind button 16 is effective for the guidance display, but ineffective for the film rewinding.

However, unless the guidance mode is set, the film winding is performed (allowed) immediately after the midroll rewind button 16 is operated.

Release Button 10: Half Press

"The shutter button is half pressed. Autofocus, and the automatic exposure mechanism are working."

Release Button 10: Full Press

"The shutter button is fully pressed. The shutter is released to photograph. In the guidance mode, press this button while pressing the <G> button."

Even after the shutter is released, this display is kept for a certain time.

In the guidance mode, if photography is unnecessarily performed by full press of the release button 10 while the photographer just checks the function or the like of each operating member in the guidance information, the film and energy for flash firing are wasted.

In this embodiment, to overcome such inconvenience, with the guidance information displayed (in a guidance mode), the photography is not performed unless the release button 10 is operated while pressing the G button 5.

Specifically, unless the release button 10 is operated while pressing the G button 5, the photography in accordance with the full press of the release button 10 is prohibited. In other words, the full press of the release button 10 is effective for the guidance display, but ineffective for the photographing operation.

However, unless the guidance mode is set, the photographing operation is performed (allowed) immediately after the full press of the release button 10.

Thus, this embodiment is configured to prevent a possibility that, in the guidance mode, the film rewinding operation or the photographing operation are performed to disable photography though the photographer has no intention of film rewinding or photography, or that the film or the energy for flash firing are wasted. Thus, in the guidance mode, the photographer can freely operate various operating members (9 to 17) while seeing the guidance information, and easily learn the operations of the camera.

However, for actual photographing operation or film rewinding operation while seeing the guidance information, information on difference in operation between presence and absence of the guidance information display, that is, a description "Press this button while pressing the <G> button." is displayed in the guidance mode.

On the other hand, the photography mode setting or the operating condition setting are allowed other than the photographing operation or the film rewinding operation, so that the photographer can perform various setting or operations while seeing the guidance information to photograph in a desired mode or operating condition.

As described below, if there is no operation in the guidance mode, the display returns to a normal display after six seconds.

Figure 8:
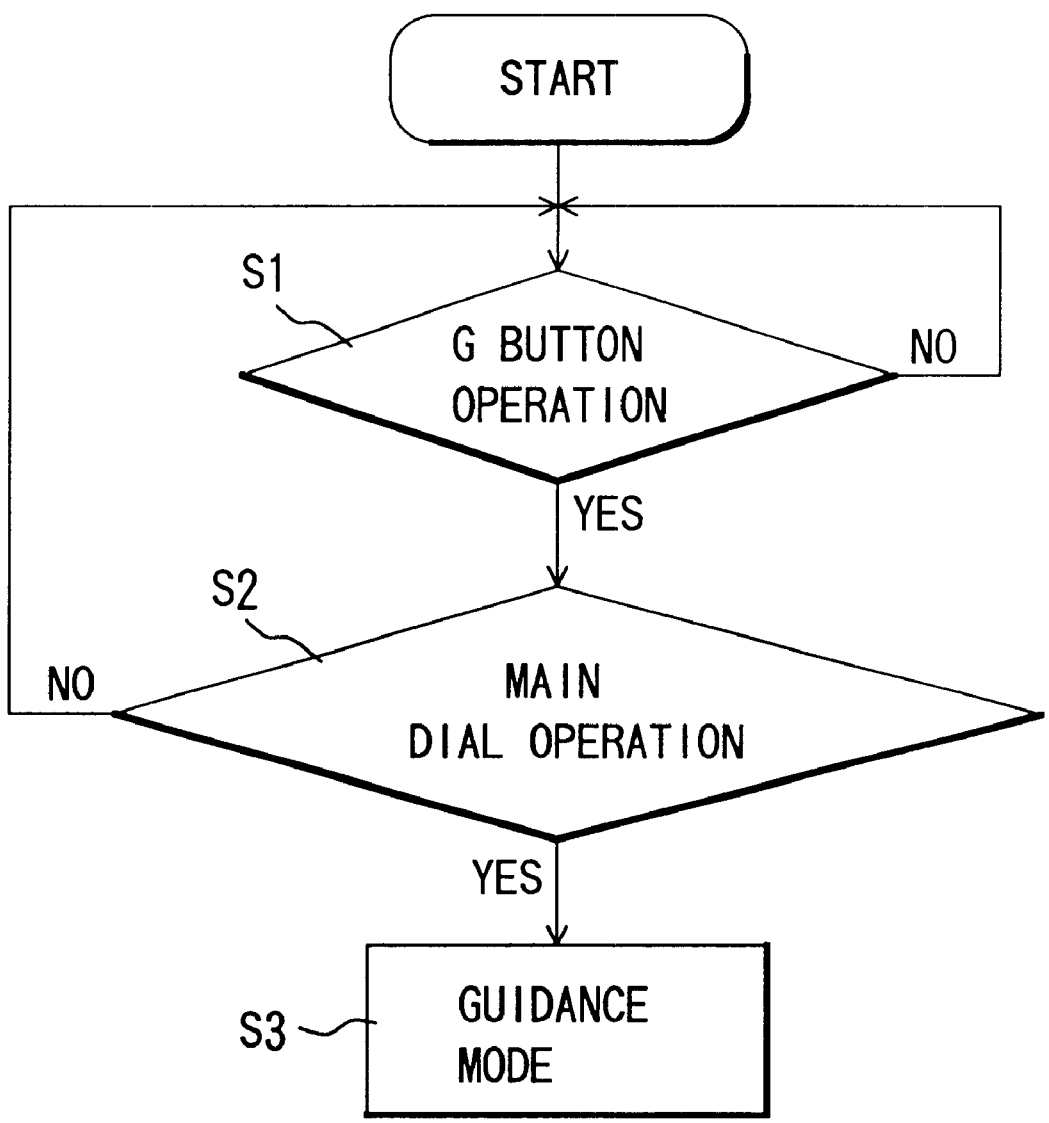
FIG. 8 is a flowchart for setting a guidance mode of the camera.
Figure 9:
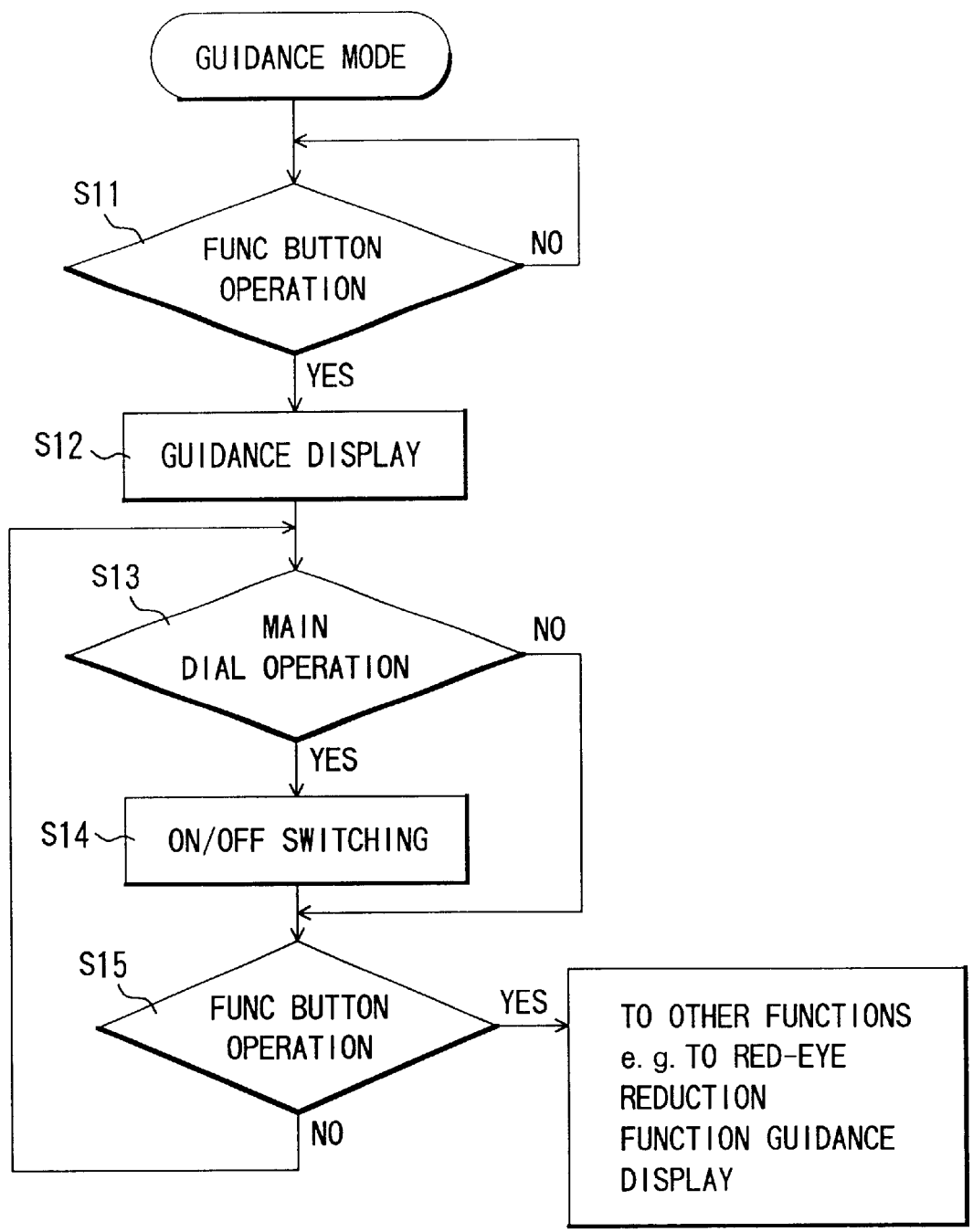
FIG. 9 is a flowchart for control (various setting control) in the guidance mode of the camera.
Figure 10:
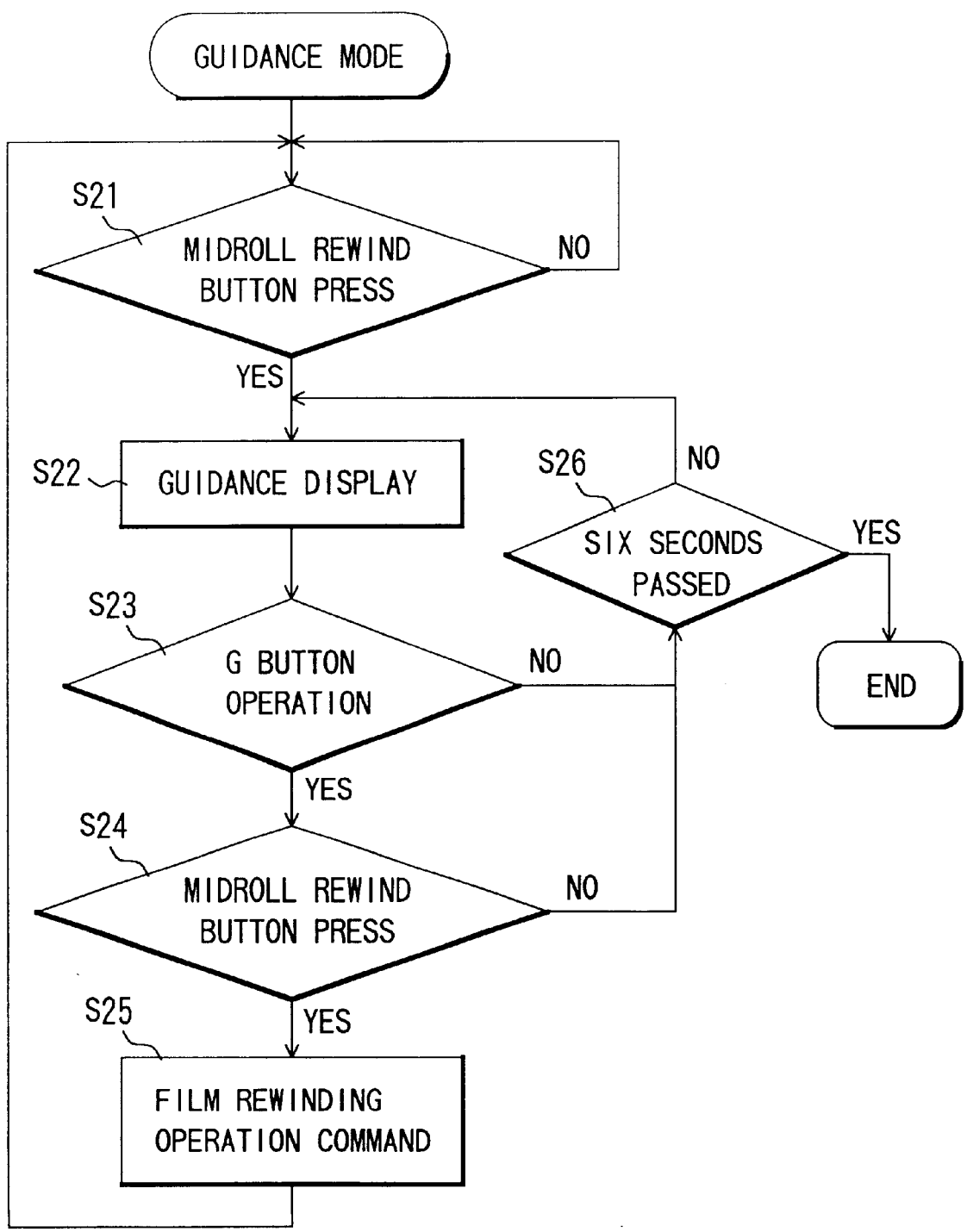
FIG. 10 is a flowchart for control (film rewinding control) in the guidance mode of the camera.

FIGS. 8 to 10 are flowcharts for control of the camera by a control circuit 50 (see FIG. 3) that is built into the camera body 1 and includes a CPU or the like.

First, FIG. 8 is a flowchart for setting the guidance mode. In this flow, when the G button 5 is pressed in Step (abbreviated as S in the drawings) 1, the process goes to Step 2. When the main dial 9 is then operated, the process goes to Step 3, and the control circuit 50 sets the guidance mode.

FIG. 9 is a flowchart for operations by the FUNC button 18 in the guidance mode. In this flow, when the FUNC button 18 is first operated in Step 11, the process goes to Step 12, and the control circuit 50 displays the guidance information on the external liquid crystal display panel 20.

When the main dial 9 is then operated in Step 13, the control circuit 50 performs detailed setting (Step 14) in the mode set at that time. For example, in the beep setting mode, each operation of the main dial 9 switches the beep on or off. Other guidance information displays or detailed settings corresponding to the operation of the mode dial 8 are similarly performed.

When the FUNC button 18 is operated (Step 15) at this time, the control circuit 50 shifts to a mode corresponding to other function, and displays guidance information corresponding to this mode.

FIG. 10 is a flowchart for control of operation of the midroll rewind button 16 in the guidance mode.

When the midroll rewind button 16 is first operated in Step 21, the control circuit 50 displays the guidance information on the midroll rewind button 16 in Step 22. Next, in Step 23, it is determined whether the G button 5 is operated, and when the G button 5 is operated, the process goes to Step 24 to determine whether the midroll rewind button 16 is operated again. Then, when the midroll rewind button 16 is operated, the process goes to Step 25 to perform film rewinding operation.

In this flowchart, unless it is determined that the G button 5 is operated, operating the midroll rewind button 16 does not cause the film rewinding operation.

Conversely, operating the midroll rewind button 16 while operating the G button 5 causes the film rewinding operation even in the guidance mode.

In Step 25, when the G button 5 is not operated, the process goes to Step 26, and after six seconds, the guidance information displayed in Step 22 is switched to the guidance information in the FUNC mode displayed in Step 12 in FIG. 9, ending the flow.

When the guidance mode is not set, the control circuit 50 performs the film rewinding operation immediately after the midroll rewind button 16 is operated.

Figure 11:
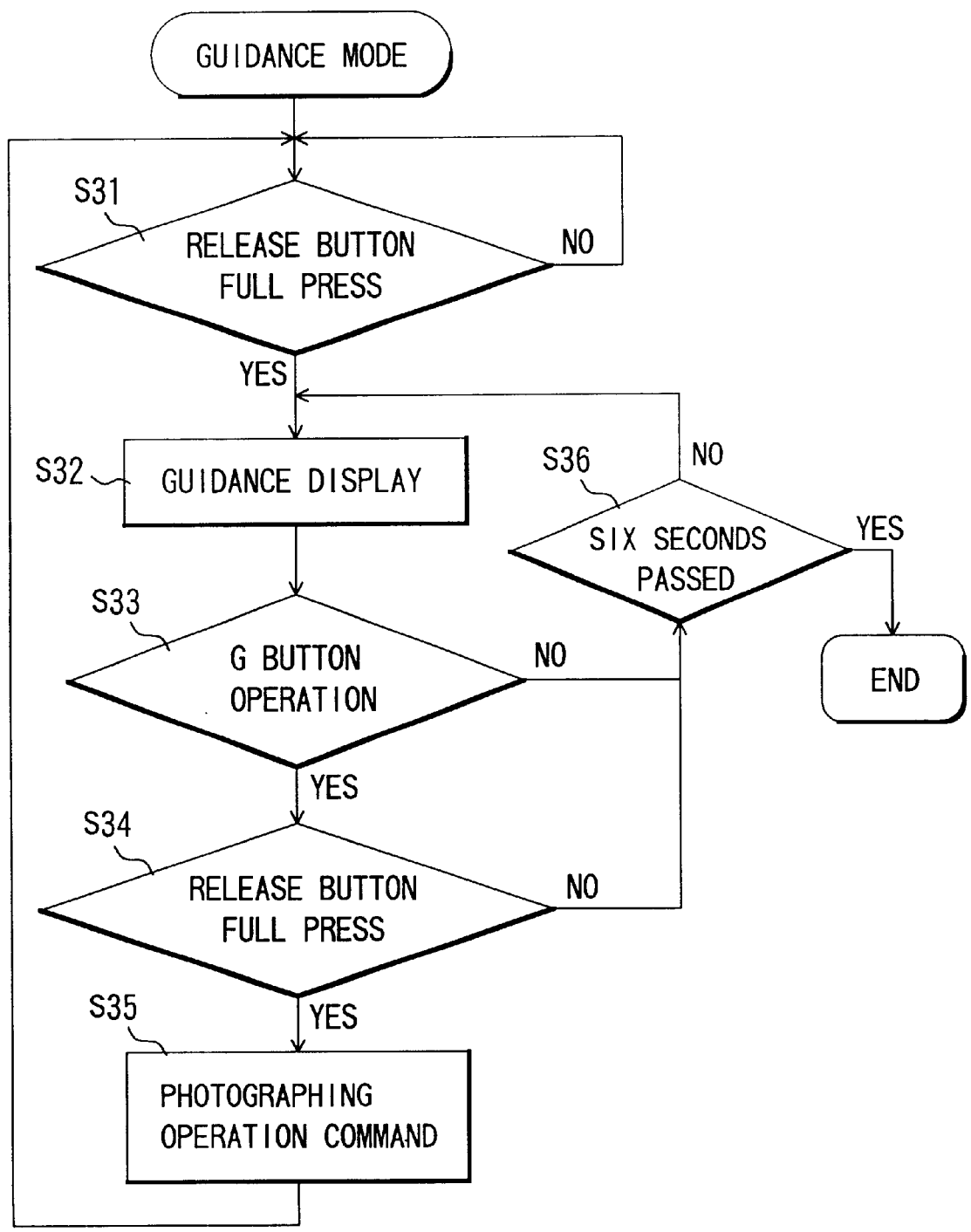
FIG. 11 is a flowchart for control (release control) in the guidance mode of the camera.

FIG. 11 is a flowchart for control of the full press of the release button 10 in the guidance mode.

When the release button 10 is fully pressed in Step 31, the control circuit 50 displays the guidance information on the full press of the release button 10 in Step 32. Next, in Step 33, it is determined whether the G button 5 is operated, and when the G button 5 is operated, the process goes to Step 34 to determine whether the release button 10 is fully pressed again. Then, when the release button 10 is fully pressed, the process goes to Step 35 to perform photographing operation.

In this flowchart, unless it is determined that the G button 5 is operated, the full press of the release button 10 does not cause the photographing operation.

Conversely, the full press of the release button 10 while operating the G button 5 causes the photographing operation even in the guidance mode.

In Step 33, when the G button 5 is not operated, the process goes to Step 36, and after six seconds, the guidance information displayed in Step 32 is switched to the guidance information in the FUNC mode displayed in Step 12 in FIG. 9, ending the flow.

When the guidance mode is not set, the control circuit 50 performs the photographing operation immediately after the release button 10 is fully pressed.

In this embodiment, it is described that the film rewinding and the photographing operations are prohibited unless the G button 5 is operated in the guidance mode, but other operations may be prohibited. For example, the manual film sensitivity setting may be prohibited unless the G button 5 is operated in the guidance mode. It is because photography in a correct range becomes impossible when the film sensitivity setting is significantly different from the sensitivity of the loaded film.

This embodiment is described on the film camera, but the present invention may be applied to a digital camera that photoelectrically converts a subject image by an image pickup device such as a CCD or a CMOS to create image information and record the image information on an electronic recording medium such as an arbitrary memory. Specifically, in the guidance mode, image-taking operation (operation of recording photoelectric conversion information by the image pickup device on the electronic recording medium) may be prohibited unless the G button is operated.

The film rewinding operation or the photographing operation (image-taking operation) in the guidance mode may be prohibited only when a recording medium such as a film or a memory is loaded in the film camera or the digital camera. Specifically, when no recording medium is loaded in the camera, the film rewinding operation or the photographing operation (image-taking operation) may be performed immediately after the midroll rewind button 16 is operated or the release button 10 is fully pressed similarly to when the guidance mode is not set, even if the guidance mode is set.

In this case, it is determined whether the recording medium is loaded when shifting to the guidance mode, and when determined that no recording medium is loaded, operation in accordance with the operation of the release button 10 or of the midroll rewind button 16 is performed.

In this embodiment, it is described that the film rewinding operation or the photographing operation prohibited in the guidance mode can be performed by a predetermined operation (operating the G button 5), but these operations may be completely prohibited. In this case, resetting the guidance mode allows the film rewinding operation or the photographing operation.

In this embodiment, it is described that the film rewinding operation or the photographing operation is allowed by operating the midroll rewind button 16 or the release button 10 while pressing the G button 5, but the film rewinding or the photography may be allowed by operating the midroll rewind button 16 or the release button 10 several times during display of the guidance information or operating the midroll rewind button 16 or the release button 10 for more than a predetermined time.

Figure 12:
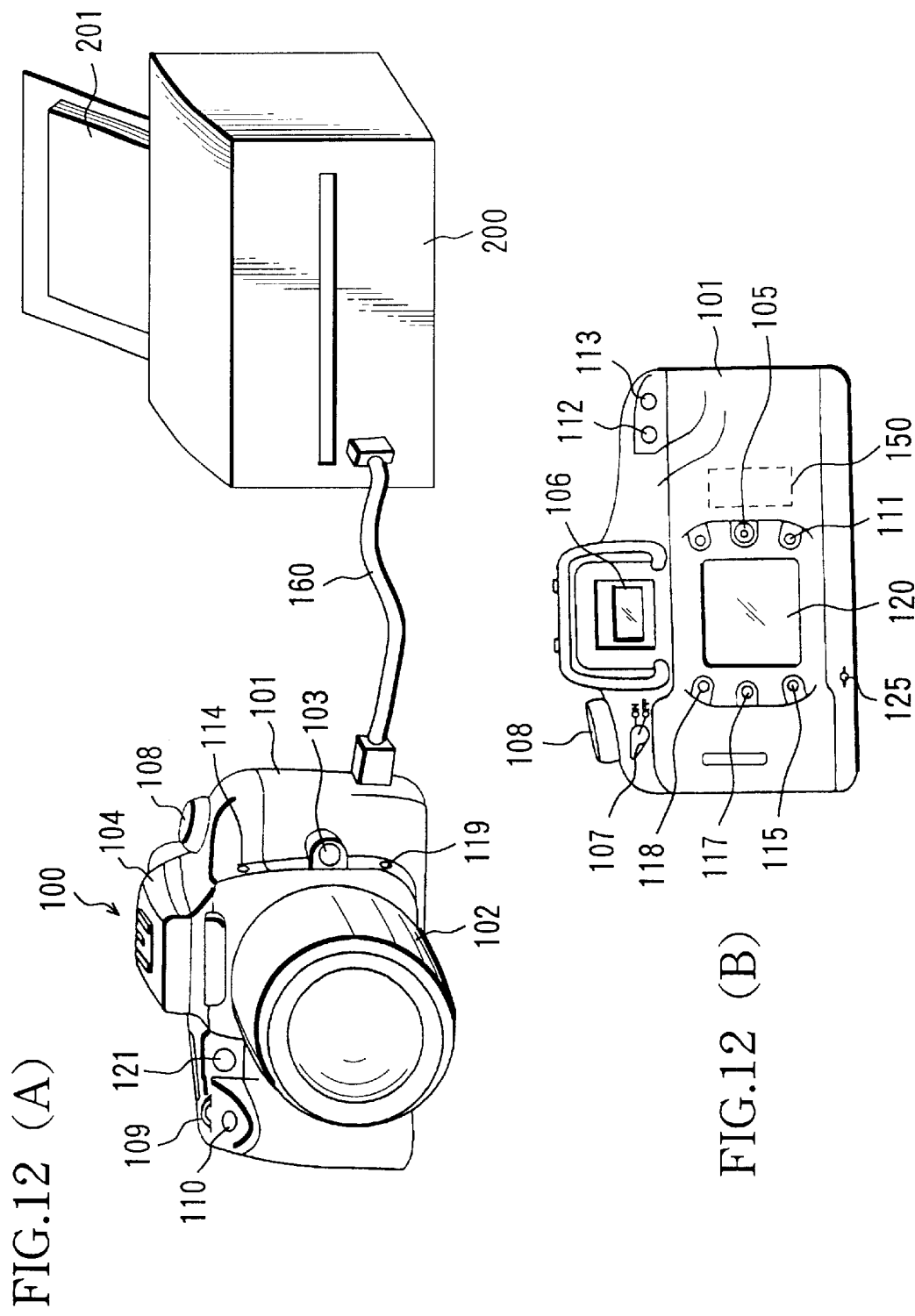
FIG. 12 is a schematic view of a digital camera according to another embodiment of the invention.

FIG. 12 shows a digital camera according to another embodiment of the invention.

The digital camera 100 photoelectrically converts a subject image by an image pickup device (not shown) such as a CCD or a CMOS to create image information, record the image information on an electronic recording medium (not shown) such as an arbitrary memory, and output the image information recorded in the electronic recording medium through a cable 160 to a printer 200.

The printer 200 into which the image information has been input prints on recording sheets 201 based on the image information.

A camera body 101 of the digital camera 100 has various operating members or an external display panel like those of the film camera of the above described embodiment. Like operating members or a like external display panel as in the film camera of the above described embodiment are denoted by reference numerals having one hundred added to the reference numerals in FIG. 1 or the other figures, and descriptions thereof are omitted. However, no film is used in the digital camera 100, so that no midroll rewind button is provided, and instead, an image output button 125 is provided for output of the image information recorded in the electronic recording medium.

In the digital camera of this embodiment, like the film camera of the above described embodiment, image-taking operation (operation of photoelectrically converting a subject image by the image pickup device to create image information and record the image information on the electronic recording medium) is not performed even if a release button 110 is fully pressed, unless a G button 105 is operated in the guidance mode, and the output of the image information to the printer 200 is also prohibited unless the G button 105 is operated, in the guidance mode.

Specifically, with the guidance information displayed, simply operating the image output button 125 does not cause the output of the image information to the printer 200 until the image output button 125 is operated while operating the G button 105.

Thus, wasteful printing by the printer 200 can be prevented when a photographer having no intention to print the image information operates the image output button 125 simply for seeing the guidance information.

Figure 13:
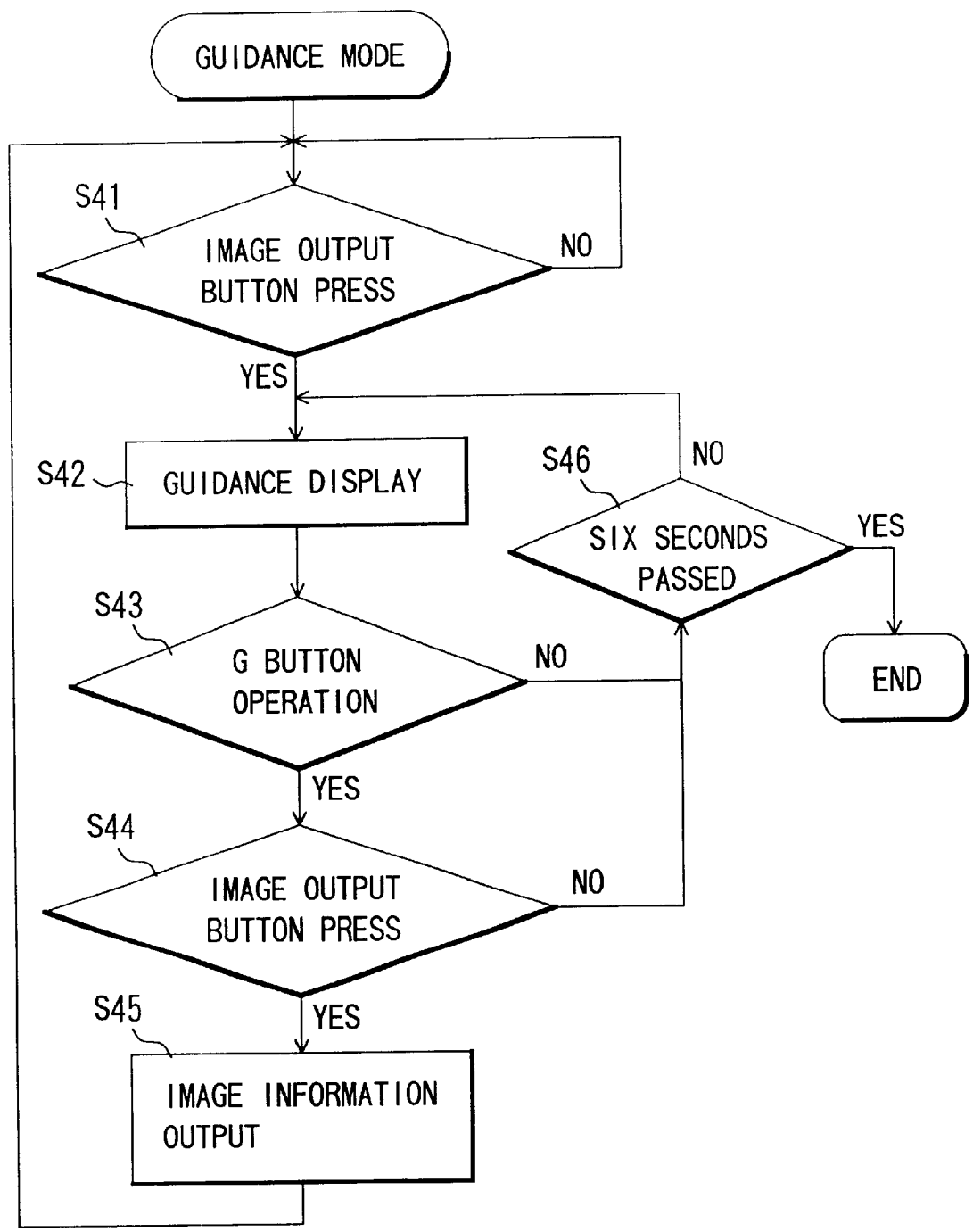
FIG. 13 is a flowchart for control (image information output control) in a guidance mode of the digital camera.

FIG. 13 is a flowchart of control contents in the digital camera of this embodiment.

When the image output button 125 is operated in Step 41, a control circuit 150 displays guidance information on the image output button 125.

The guidance information on the image output button 125 is, for example, as follows:

"Image output button. Press this button with the camera connected to a printer, so you can print photographed images."

This guidance information also includes information: "In the guidance mode, press this button while pressing the <G> button."

Next, in Step 43, it is determined whether the G button 105 is operated, and when the G button 105 is operated, the process goes to Step 44, and it is determined whether the image output button 125 is operated again. Then, when the image output button 125 is operated, the process goes to Step 45 to perform the output operation of the image information to the printer 200.

In this flowchart, unless it is determined that the G button 105 is operated, operating the image output button 125 does not cause the output operation of the image information (the output operation of the image information is prohibited).

Conversely, operating the image output button 125 while operating the G button 105 causes the output operation of the image information even in the guidance mode.

In Step 45, when the G button 105 is not operated, the process goes to Step 46, and after six seconds, the guidance information displayed in Step 42 is switched to the guidance information in the FUNC mode displayed in Step 12 in FIG. 9, ending the flow.

When the guidance mode is not set, the control circuit 150 performs the output operation of the image information immediately after the image output button 125 is operated.

The output operation of the image information in the guidance mode may be prohibited only when the electronic recording medium is loaded in the camera. Specifically, when no electronic recording medium is loaded in the camera, the output operation of the image information may be performed immediately after the image output button 125 is operated similarly to when the guidance mode is not set, even if the guidance mode is set.

In this case, it is determined whether the electronic recording medium is loaded or not when shifting to the guidance mode, and when determined that the recording medium is not loaded, the output operation of the image information in accordance with the operation of the image output button 125 is performed.

In this embodiment, it is described that the output operation of the image information prohibited in the guidance mode can be performed by a predetermined operation (operating the G button 105), but this output operation may be completely prohibited. In this case, resetting the guidance mode allows the output operation of the image information.

In this embodiment, it is described that the output operation of the image information is allowed by operating the image output button 125 while pressing the G button 105, but the output operation of the image information may be allowed by operating the image output button 125 several times during display of the guidance information or operating the image output button 125 for more than a predetermined time.

As described above, according to the embodiments, the photographing operation (image-taking operation), the photographing disabling operation, or the output operation of the image information is prohibited while the guidance information is displayed, so that when the photographer who tries to display the guidance information or learn the operations while seeing the guidance information operates the operating members corresponding to the photographing operation, the photographing disabling operation, or the output operation of the taken image information, these operations are prevented from being actually performed.

Thus, the photographer can operate various operating members while seeing the guidance information without the undesired operation performed.

On the other hand, the photographer can also perform various settings while seeing the guidance information since setting the state (mode or the like) of the camera or the operating condition is allowed even when the guidance information is displayed.

Therefore, the photographer does not have to always carry the instruction manual of the camera, and can easily perform photography (image-taking) making full use of functions of the camera while seeing the guidance information.

While preferred embodiments have been described, it is to be understood that modification and variation of the present invention may be made without departing from the sprit or scope of the following claims.

What is claimed is:

1. A camera comprising:
    a plurality of operating members which are operated to set states of the camera and operating conditions, or to cause the camera to perform operations;
    a display unit which displays guidance information on the set state of the camera, the set operating condition, and said operating members; and
    a control circuit which allows setting the state of the camera and the operating condition in accordance with operation of said operating member and prohibiting any image-taking operation, when said guidance information is displayed on said display unit.

2. The camera according to claim 1,
    wherein said control circuit prohibits any image-taking disabling operation in accordance with operation of said operating member, when said guidance information is displayed on said display unit.

3. The camera according to claim 1,
    wherein said control circuit allows setting the state of the camera and the operating condition in accordance with the operation of said operating member and prohibits any image-taking operation, when a recording medium for recording images is loaded in the camera and said guidance information is displayed on said display unit.

4. The camera according to claim 1, further comprising a guidance display switch which is operated to switch display/non-display of said guidance information on said display unit,
    wherein said control circuit allows image-taking operation when an operating member which causes the camera to perform image-taking operation together with said guidance display switch is operated, when said guidance information is displayed on said display unit.

5. The camera according to claim 2,
    wherein said control circuit allows setting the state of the camera and the operating condition in accordance with the operation of said operating member and prohibits any image-taking disabling operation, when the recording medium for recording images is loaded in the camera and said guidance information is displayed on said display unit.

6. The camera according to claim 2, further comprising the guidance display switch which is operated to switch display/non-display of said guidance information on said display unit,
    wherein said control circuit allows said image-taking disabling operation when an operating member which causes the camera to perform said image-taking disabling operation together with said guidance display switch is operated, when said guidance information is displayed on said display unit.

7. The camera according to claim 1,
wherein said control circuit allows image-taking operation in accordance with the operation of said operating member, when said guidance information is not displayed on said display unit.

8. The camera according to claim 2,
wherein said control circuit allows image-taking disabling operation in accordance with the operation of said operating member, when said guidance information is not displayed on said display unit.

9. A camera comprising:
a plurality of operating members which are operated to set states of the camera and operating conditions, or to cause the camera to perform operations;
a display unit which displays guidance information on the set state of the camera, the set operating condition, and said operating members; and
a control circuit which allows setting the state of the camera and the operating condition in accordance with operation of said operating member and prohibiting any output operation of taken image information, when said guidance information is displayed on said display unit.

10. The camera according to claim 9,
wherein said control circuit allows setting the state of the camera and the operating condition in accordance with the operation of said operating member and prohibits the output operation of the taken image information, when a recording medium which records images is loaded in the camera and said guidance information is displayed on said display unit.

11. The camera according to claim 9, further comprising a guidance display switch which is operated to switch display/non-display of said guidance information on said display unit,
wherein said control circuit allows the output operation of the taken image information when an operating member which causes the camera to perform the output operation of taken image information together with said guidance display switch is operated, when said guidance information is displayed on said display unit.

12. The camera according to claim 9,
wherein said control circuit allows the output operation of the taken image information in accordance with the operation of said operating member, when said guidance information is not displayed on said display unit.

13. A camera comprising:
a plurality of operating members which are operated to cause the camera to perform predetermined operations, said operating members including a printing operating member which is operated to cause a printer to perform printing operation; and
a control circuit which makes the camera perform operations in accordance with operations of predetermined operating members except at least said printing operation in accordance with an operation of the printing operating member, when guidance information is displayed on said operating members.

14. A camera comprising:
an operating member which sets states of the camera;
a display unit which displays guidance information of the set state of the camera; and
a circuit which allows setting of the camera in accordance with an operation of said operating member, when the guidance information is displayed on said display unit.

15. The camera to claim 14, further comprising:
a guidance setting member which makes the display unit display the guidance information.

16. The camera according to claim 14, further comprising:
another operating member which makes the camera perform image-taking operation; and
a prohibiting circuit which prohibits image-taking operation in accordance with operation of said other operating member, when the guidance information is displayed on said display unit.

17. The camera according to claim 14, wherein a plurality of said operating members is provided.

* * * * *